(12) United States Patent
Buettgen

(10) Patent No.: US 11,248,847 B1
(45) Date of Patent: Feb. 15, 2022

(54) MULTI-ACCESS HEAT TOLERANT CREMATORY LIFT

(71) Applicant: John J. Buettgen, Schofield, WI (US)

(72) Inventor: John J. Buettgen, Schofield, WI (US)

( * ) Notice: Subject to any disclaimer, the term of this patent is extended or adjusted under 35 U.S.C. 154(b) by 0 days.

(21) Appl. No.: 17/097,765

(22) Filed: Nov. 13, 2020

(51) Int. Cl.
| | |
|---|---|
| *F27D 3/06* | (2006.01) |
| *B66F 9/16* | (2006.01) |
| *B65G 13/00* | (2006.01) |
| *F27D 3/12* | (2006.01) |
| *F23G 1/00* | (2006.01) |

(52) U.S. Cl.
CPC .............. *F27D 3/06* (2013.01); *B65G 13/00* (2013.01); *B66F 9/16* (2013.01); *F23G 1/00* (2013.01); *F27D 2003/126* (2013.01)

(58) Field of Classification Search
CPC ........ F27D 3/06; F27D 2003/126; B66F 7/22; B66F 9/16; A61G 7/1048; A61G 19/00; B65G 13/00
USPC ....... 414/182, 207, 641, 642, 603, 598, 639, 414/628
See application file for complete search history.

(56) References Cited

U.S. PATENT DOCUMENTS

| | | | | |
|---|---|---|---|---|
| 1,641,651 A | * | 9/1927 | Wulf | .......................... F27D 3/06 414/198 |
| 2,599,052 A | | 6/1952 | Forman | |
| 3,380,606 A | * | 4/1968 | Trumpore | ................. B66F 9/16 414/491 |
| 4,890,367 A | * | 1/1990 | Crawford | .................. F23G 1/00 27/26 |

FOREIGN PATENT DOCUMENTS

| | | | | |
|---|---|---|---|---|
| GB | 2368317 | * | 10/2000 | ............. A61G 13/00 |
| GB | 2515743 | * | 1/2015 | ............. A61G 21/00 |

OTHER PUBLICATIONS

Photo of Tobit Enterprise lift disclosed more than one year prior to Nov. 13, 2020.
"Coffin Lifter | Liftmate." https://www.medicalsearch.com.au/coffin-lifter-liftmate/p/127297 downloaded Aug. 11, 2021.
Logitrans Stacker, Howard Handling.

* cited by examiner

*Primary Examiner* — Mark C Hageman
(74) *Attorney, Agent, or Firm* — Stiennon & Stiennon

(57) ABSTRACT

A crematory lift has a frame with a vertically extending member with a carriage with tines mounted for vertical displacement. A support bed is pivotably mounted to the carriage tines and has a ball segment on its rearward end with rotatable balls permitting sideward positioning of a decedent thereon and a roller segment on the forward end which permits the forward displacement of the decedent. A hydraulic actuator extends between the carriage and the support bed rear where it is remote from the oven's heat and operates to raise and incline the support bed to discharge the decedent into the oven. The support bed has four forward strap mounts with U-shaped slots with strap support tabs which receive straps for lifting of a decedent positioned below the support bed.

13 Claims, 3 Drawing Sheets

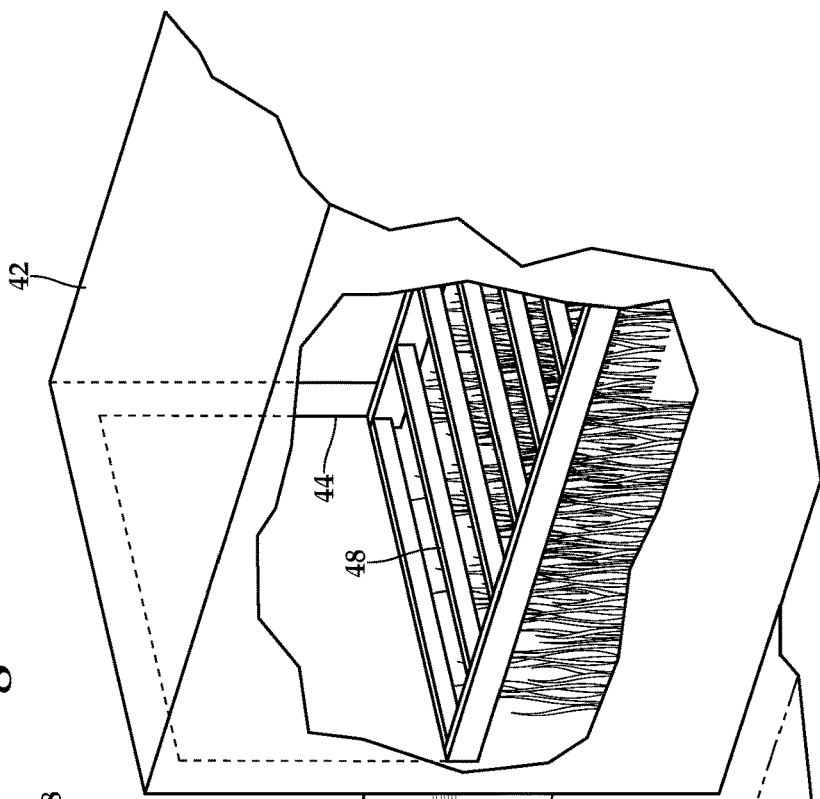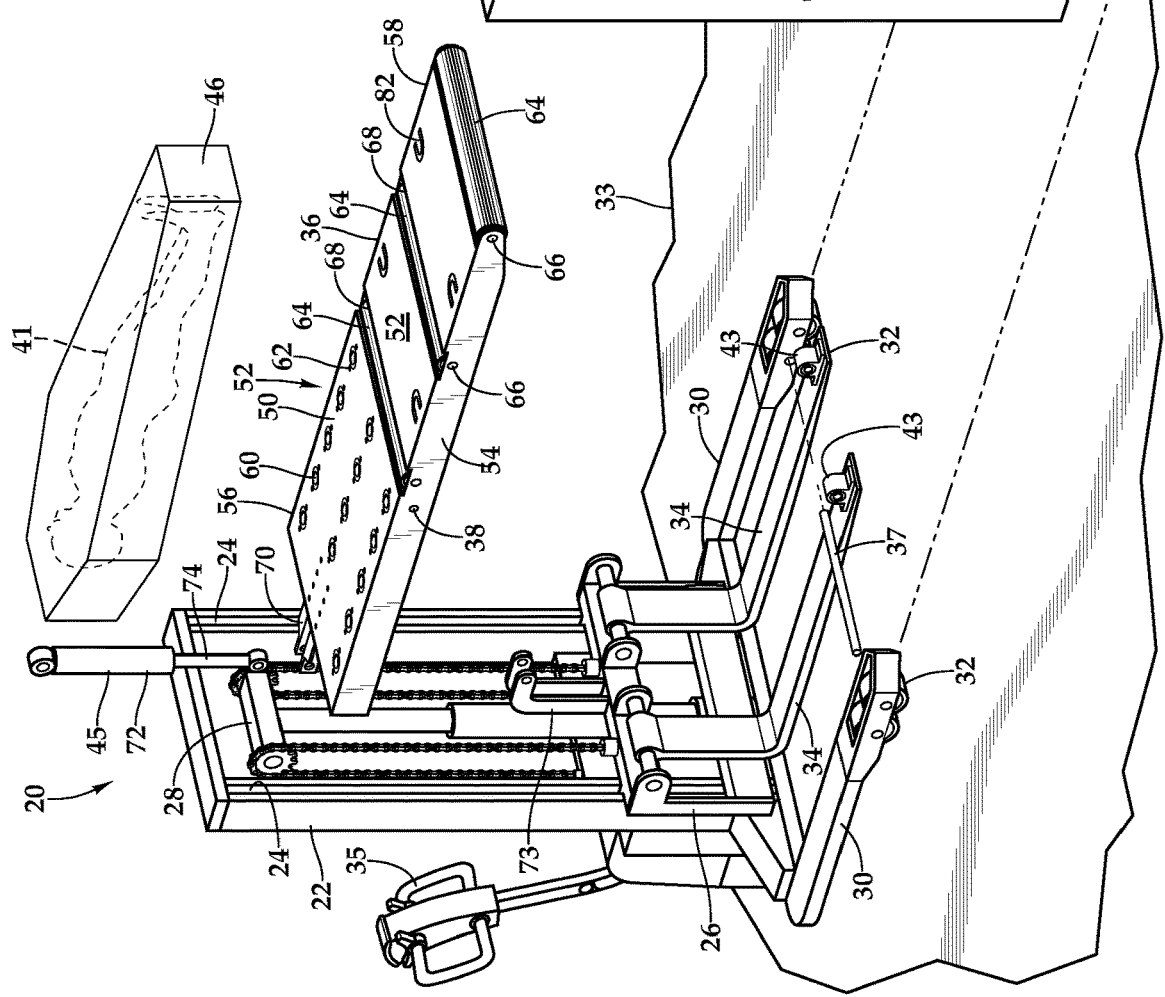

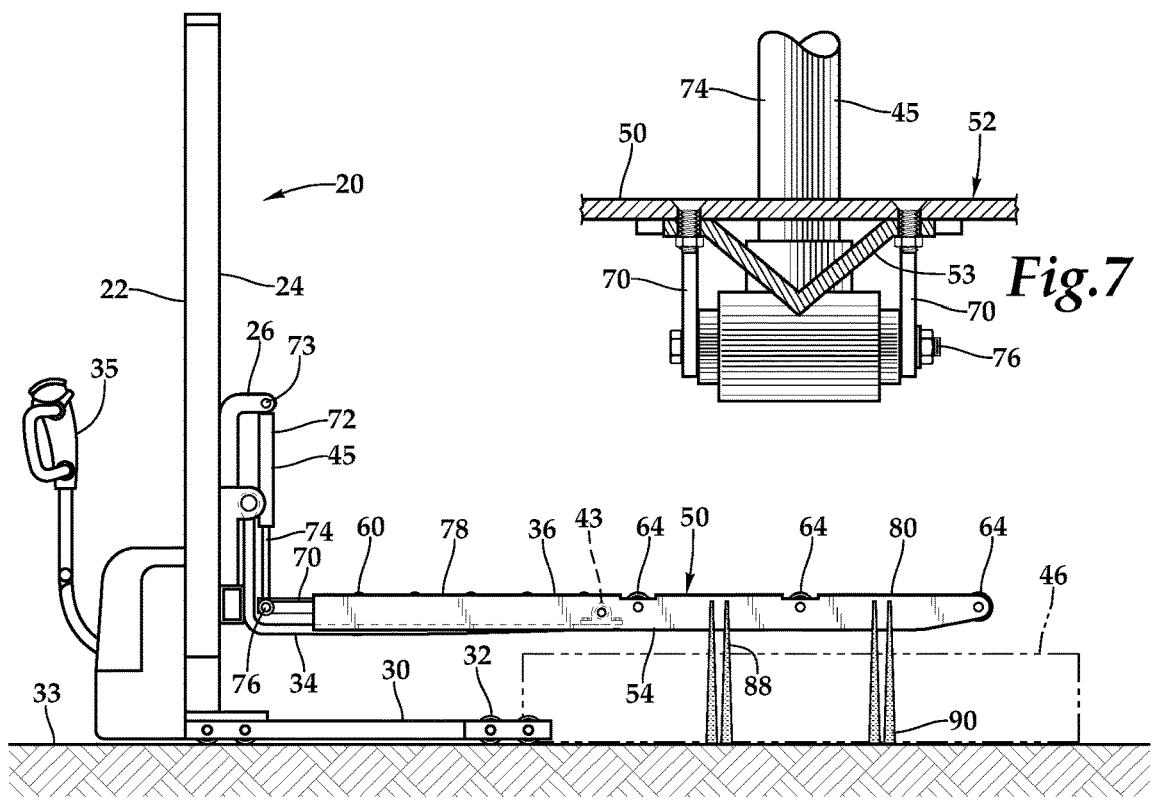
Fig.2
Fig.7
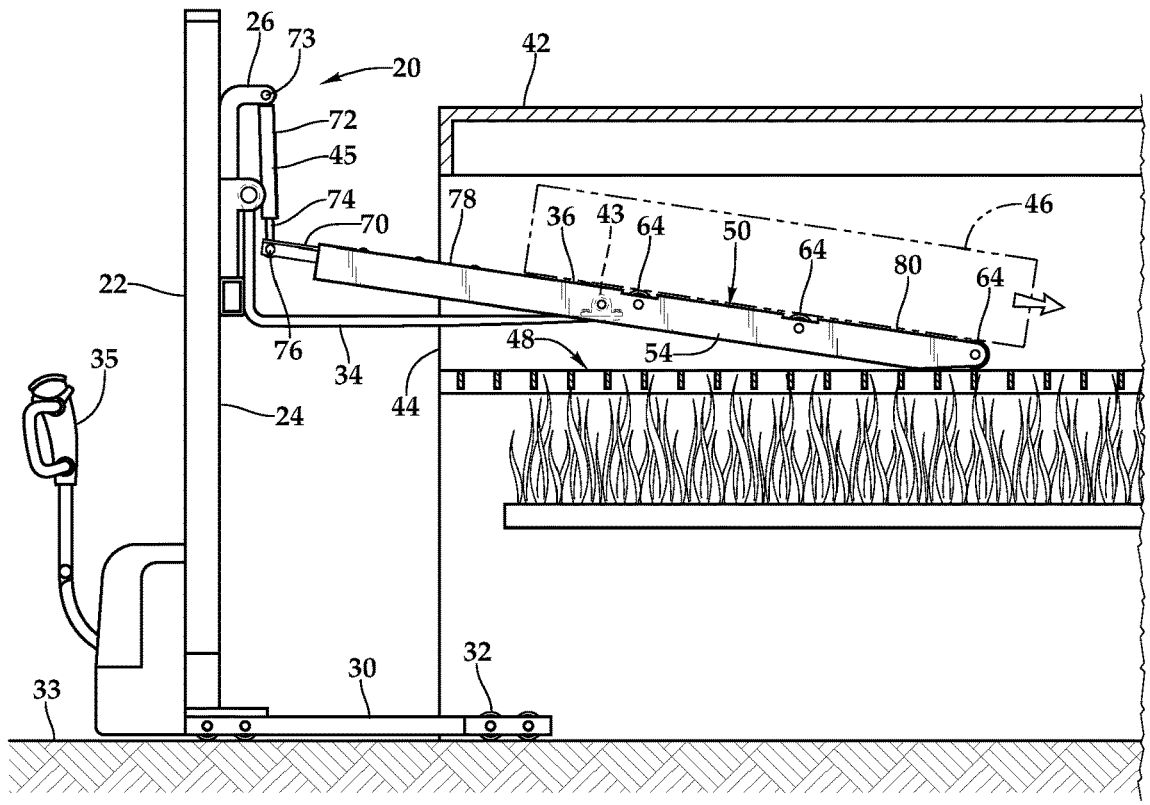
Fig.3

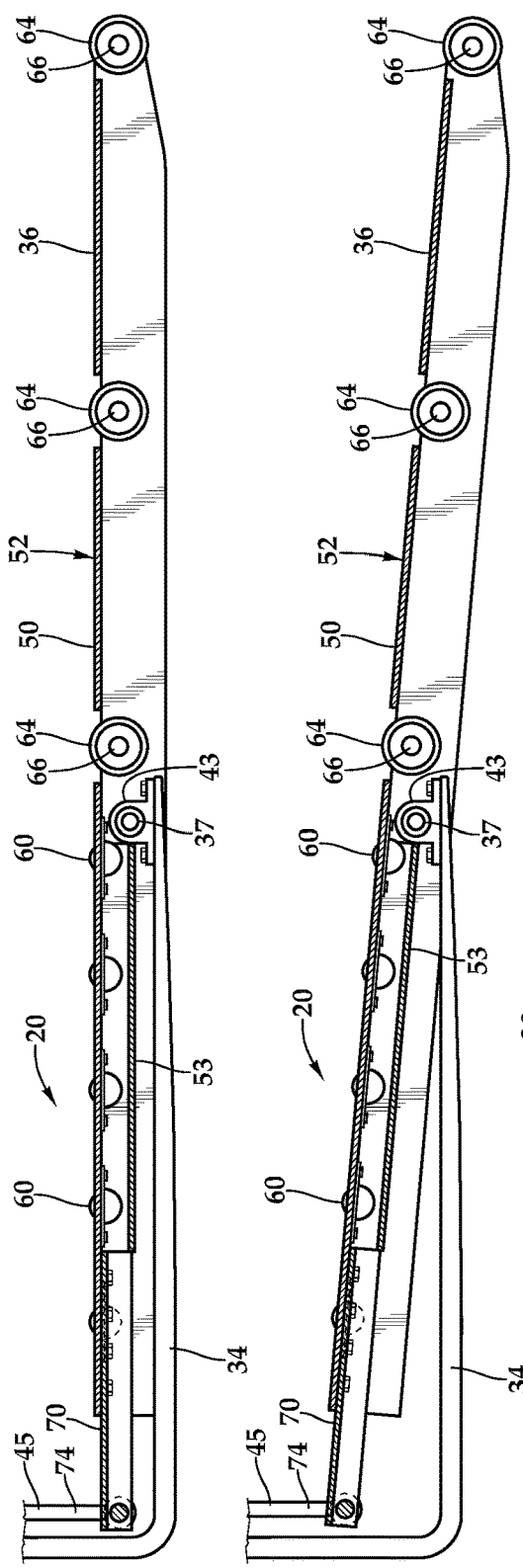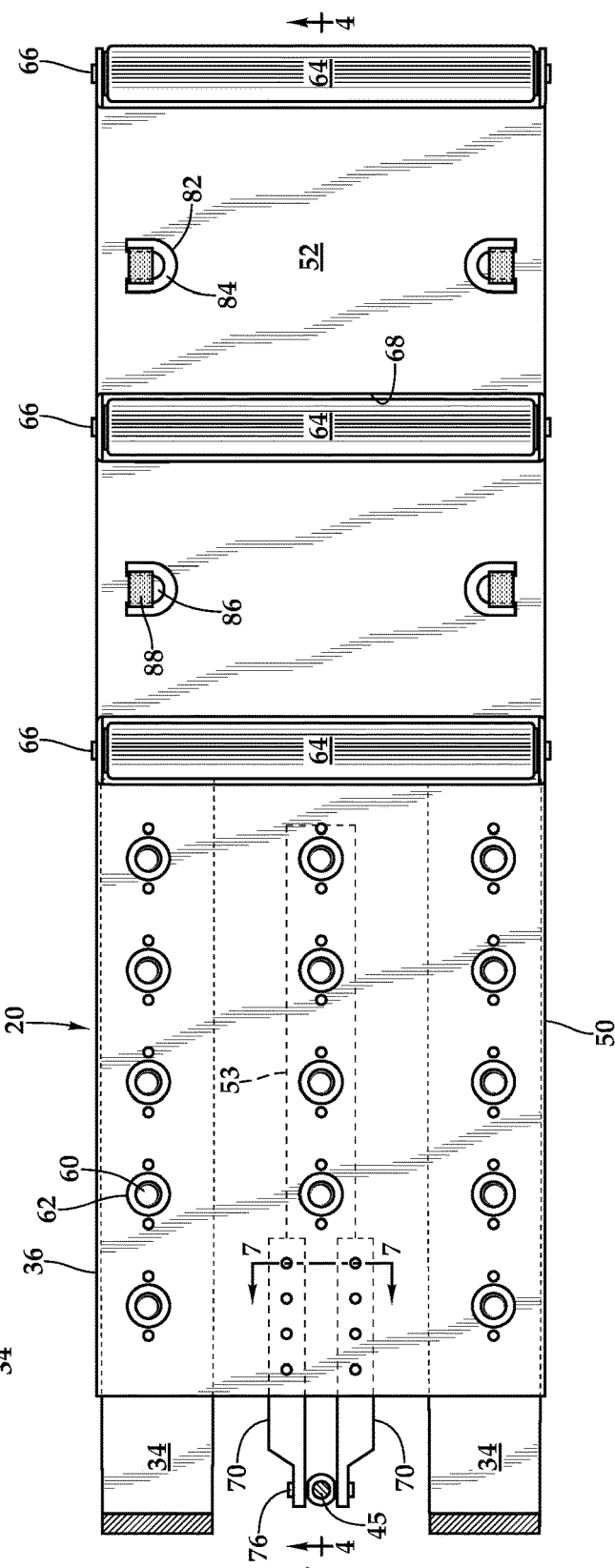

United States Patent US 11,248,847 B1

MULTI-ACCESS HEAT TOLERANT CREMATORY LIFT

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to lift devices to present the body of a deceased person (called "the decedent") to a mortuary crematory oven.

When a decedent is to be cremated, the body, usually within a coffin, box, or other container, is introduced into a high temperature crematory oven, which may reach temperatures of over 1,800 degrees F. In one common current practice, the container is placed on a forklift and is aligned with the crematory oven opening and is supported on paperboard rollers within the oven. Once the oven is fired up, these paperboard rollers are consumed. The support bed is essentially inside the oven, and the lift truck is used to raise the container to the level of the crematory oven opening, which is never at floor level, but always elevated.

This approach to inserting the container into the crematory oven can be dangerous when the decedent exceeds 400 pounds. If the container comes off the disposable rollers or twists it can become jammed in the oven entrance. To correct the situation there is no simple answer, like a train coming off the tracks, special corrective equipment is needed. It becomes necessary to bring in heavy equipment like a tractor to try to engage the container, perhaps apply levers, and work to dislodge the container, all with an open oven, which, even if the flames are not being fed, could be very hot from previous use. In a worst-case scenario, the crematory facility itself can catch fire and be consumed. Such a conventional approach then, is not only inconvenient, but potentially hazardous, and in any event runs the risk of falling short of the level of decorum and respect which ought to be shown to the decedent to be cremated.

Other automated known crematory feed apparatus, involving fixed lift tables and drives can be very costly. What is needed is an arrangement for introducing a decedent to a crematory oven which is safe and effective to use, and yet which is simple to construct and operate.

SUMMARY OF THE INVENTION

The crematory lift of this invention has a support bed pivotally mounted to the fork tines of a carriage on a vertical lift. The support bed has a ball segment on its rearward end with rotatable balls permitting sideward positioning of a decedent within a container thereon and a roller segment on the forward end which permits the forward displacement of the decedent, but limits sideward displacement once the bed is within the crematory oven. An actuator extends between the carriage and the rear of the support bed which is operable to tilt the bed when it is inserted within the crematory oven to gently dispose the container with decedent on the oven support surface. Once engaged with the support surface, the friction between the container and the over support surface overcomes the resistance of the rollers and balls, so the support may be withdrawn leaving the container and decedent within the oven. The actuator is remote from the oven's heat. The support bed has four forward strap mounts with U-shaped slots defining strap support tabs which are configured to allow the straps of a sling to be supported beneath the support bed for lifting a decedent out of a container.

It is an object of the present invention to provide a crematory lift apparatus which is arranged to insert a decedent to be cremated within a crematory oven.

It is another object of the present invention to provide a crematory lift which can serve to lift a decedent out of a casket or container, as well as support the decedent for introduction into a crematory oven.

It is a further object of the present invention to provide a crematory lift with a low profile tiltable support bed to effectively enter within the crematory oven opening.

It is yet another object of the present invention to provide a crematory lift which is configured to operate in the vicinity of the high temperatures of the crematory oven.

It is an additional object of the present invention to provide a crematory lift which both admits of sideward positioning of a container thereon, while limiting the sideward displacement of the container once introduced into the crematory oven.

Further objects, features and advantages of the invention will be apparent from the following detailed description when taken in conjunction with the accompanying drawings.

BRIEF DESCRIPTION OF THE DRAWINGS

FIG. 1 is an exploded isometric view of the lift of this invention shown in relation to a decedent and a crematory oven.

FIG. 2 is a side elevational view of the lift of FIG. 1, shown with a lifting tarp attached thereto.

FIG. 3 is a side elevational view of the lift of FIG. 1, shown discharging into the crematory oven.

FIG. 4 is a fragmentary cross-sectional view of the lift of FIG. 6 taken along section line 4-4.

FIG. 5 is a fragmentary cross-sectional view of the lift of FIG. 4 with the support bed in an inclined orientation.

FIG. 6 is fragmentary top view of the lift of FIG. 1 showing the support bed.

FIG. 7 is a fragmentary cross-sectional view of the lift of FIG. 6 taken along section line 7-7.

DESCRIPTION OF THE PREFERRED EMBODIMENTS

Referring more particularly to FIGS. 1-7, wherein like numbers refer to similar parts, a crematory lift 20 is shown in FIG. 1. The lift 20 has a frame 22 with two vertically extending members 24 with a carriage 26 slidably mounted thereon. A chain actuator 28 extends between the frame 22 and the carriage 26, such that activation of the chain actuator causes the carriage to travel vertically on the frame 22. The lift 20 may be comprised of a conventional mobile forklift such as those manufactured by Ekko Material Handling Equipment Manufacturing Inc. of Pomona, Calif., modified with oven-straddling legs and a pivoting hydraulically actuated support bed as described below.

The frame 22 has two legs 30 which are spaced apart from each other a first distance in a cross direction, and which extend away from the frame in a feed direction, which is perpendicular to the cross direction. The first distance may be about 65 inches, to clear the width of a crematory oven 42. The legs 30 are provided with casters 32 which enable the entire lift 20 to be moved horizontally over a support surface 33 such as a concrete floor. The lift 20 may also be provided with an electric motor and drive wheels (not shown), which assist an operator in moving the lift over the support surface 33. The lift may be steered by the operator through the use of hand controls and a steering wheel 35.

Two tines 34 are fixed to the carriage 26 and extend in the feed direction. The tines 34 are spaced apart in the cross direction. A support bed 36 is pivotably mounted to the tines 34. Each tine 34 has a bearing 43 secured thereto, and a pivot rod 37 extends perpendicular to the feed direction and extends through the bearings 43 and is connected to the support bed.

The support bed 36 is fabricated of heavy gauge aircraft aluminum plate and has a top wall 50 with an upper surface 52. The plate may be about 12 gauge or up to about ⅜ inches thick. Two parallel side walls 54 extend downwardly from the top wall and are spaced form one another in the cross direction. The side walls 54 extend sidewardly of the two tines 34 such that sufficient stiffness is imparted to the support bed while adding the minimum vertical thickness to the assembled support bed and tines. This is advantageous when the support bed and tines with load must be inserted and maneuvered within the narrow opening 44 of the crematory oven 42. The support rod 37 may be received within openings 38 in the side walls 54. As shown in FIG. 7, a stiffening angle 53 is fixed to the top wall 50 beneath the upper surface of the top wall and extending in the feed direction to contribute to the stiffness of the support bed 36.

The support bed 36 has a ball segment 56 on the end facing the carriage and a roller segment 58 positioned frontwardly of the ball segment. The ball segment 56 of the support bed has a plurality of rotatable spherical balls 60 mounted in ball housings 62 to the top wall 50. The balls 60 project above the upper surface 52 of the top wall. The roller segment 58 of the support bed 36 has a plurality of cylindrical rollers 64 rotatably mounted on axles 66 between the side walls 54. The rollers 64 are mounted with respect to the top wall to project through slots 68 in the top wall and extend above the upper surface 52 of the top wall and the axles extend in a cross direction. The forwardmost roller 64, as shown in FIG. 6, projects beyond the side walls 54 at the front end of the support bed, such that the roller is clear to touch down on the surface 48 of the oven. The support bed 36 is thus configured to receive a load for sideward positioning on the ball segment of support bed, especially when the container 46 is being transferred onto the support bed. The balls 60 allow omnidirectional low friction positioning of the container 46 for convenient positioning on the support bed 36. The roller segment 58 is configured for advancement of the container 46 with decedent 41 exclusively in the feed direction into the crematory oven 42, thereby minimizing the risk that the container should go askew when it is being discharged into the oven. The support bed 36 is thus mounted by the carriage 26 for movement in a vertical direction, to permit a container 46 containing a decedent 41 to be placed on the support bed to be raised from a floor surface to a level sufficient to be inserted within the crematory oven 42.

Two pivot arms 70 are fixed beneath the support bed 36 top wall 50 and may be in the form of angle members. The pivot arms 70 extend rearwardly in the feed direction from the top wall 50 towards the frame vertical members 24. As shown in FIGS. 2 and 3, an actuator 45 has a cylinder 72 pivotably mounted to frontwardly extending brackets 73 on the carriage 26 with an extensible piston 74 which is pivotably connected between the two pivot arms 70 such as by a bolt 76. The actuator 45 is operable by the lift operator to tilt the support bed forwardly, as shown in FIGS. 3 and 5. The rearward extension of the pivot arms 70 permits the actuator 45 to be positioned entirely rearwardly of the support bed in a location remote from the intense heat of the crematory oven 42. The actuator 45 is preferably a hydraulic actuator, such actuators being tolerant of the high temperatures encountered in the vicinity of the crematory oven 42.

The crematory lift 20 provides multi-access functionality enabling the same apparatus to perform multiple functions. As shown in FIG. 2 the support bed has a first segment 78 which overlies the tines 34 and extends between the bearings and the vertical members 24 of the frame 22, and a second segment 80 which extends in the feed direction beyond the bearings and the tines. The second segment 80 thus extends free of the tines and the space between the second segment and the support surface 33 is unobstructed.

As shown in FIG. 6 the top wall 50 has portions which define a plurality of strap mounts 82. Each strap mount 82 has a U-shaped slot 84 which pierces the top wall and which wraps around a strap support tab 86. The slot may comprise a cut-out which is about ¼ inch wide and the distance between the outsides of the slot across the support tab 86 may be about two inches. Because the strap mounts 82 are all positioned in the support bed second segment 80, each is unobstructed by the carriage tines. The strap mounts 82 are located near the perimeter of the support bed and are configured to receive the looped straps 88 of a sling 90. The slots 84 are wide enough that a looped strap 88 can be passed through, so the strap does not need to be threaded through the opening. As shown in FIG. 2, each strap 88 may be conveniently passed over the strap support tab 86 of a strap mount 82 to extend as part of the sling beneath a decedent positioned beneath the support bed 36. The carriage 26 may be lifted to thereby elevate the support bed on the vertical member of the frame and lift the sling 90 and the decedent therein. This is particularly helpful when it is required to lift a decedent from within a container such as a casket prior to being placed within the container 46 for introduction within the crematory oven. As the strap mounts 82 are entirely defined by the through slots 84 in the top wall, there are no projecting elements of the mounts which would otherwise obstruct the smooth passage of a load over the support bed upper surface 52.

As shown in FIG. 1, the crematory oven 42 may be a gas fired oven capable of reaching interior temperatures of at least 1,800 degrees Fahrenheit and has an exterior width in the cross direction which is less than the first distance such that the support bed may be inserted within an oven opening 44 of the crematory oven, while the legs 30 may be positioned exterior to the oven. The support bed 36 is positionable to receive thereon a decedent 41 within a container 46 for introduction into the crematory oven for cremation therein. From the support bed 36 the decedent within the container 46 may be discharged into the oven, and the lift 20 withdrawn from the oven, to thereby dispose the decedent and container onto a surface 48 within the oven for cremation of the decedent.

The carriage 26 is disposed on the vertical members 24 so that the support bed 36 can be tipped by the actuator 45 away from the vertical members, such that the decedent within the container 46 can be inclined towards the oven interior surface 48 to thereby engage the surface and permit the lift 20 to be withdrawn so as to extract the support bed and release the decedent within the container 46 onto the oven surface for cremation within the oven. The frontmost roller

64 of the support bed 36 is exposed so that the roller itself can engage the interior oven surface 48, allowing the operator to assess a pinpoint drop zone within inches of a desired location in the retort of the crematory oven. Once the support bed is sufficiently inclined, the container slides off the support bed on to the oven interior surface or floor. Once the container 46 gently engages the floor, it frictionally engages it, and the support bed can be retracted, thereby depositing the entire container within the oven without significant sliding along the oven surface. The rollers 64 and balls 60 facilitate the separation of the container from the support bed upper surface.

The rollers 64 and balls 60 are mounted by bearings which may include a lubricant which preferably comprises high temperature lubricating oil, such as is used in automotive race engines, which can tolerate the high temperatures encountered within the crematory oven. The hydraulic lines in the device are preferably provided with heat shielding.

It is understood that the invention is not limited to the particular construction and arrangement of parts herein illustrated and described, but embraces all such modified forms thereof as come within the scope of the following claims.

I claim:

1. A crematory lift comprising:
   a frame having a vertically extending member;
   portions of the frame which define two legs spaced apart from each other a first distance in a cross direction, and which extend away from the frame in a feed direction, which is perpendicular to the cross direction;
   a carriage mounted to the frame for vertical motion thereon, the carriage having a frontward member which extends away from the frame vertically extending member in the feed direction;
   a support bed which is pivotably mounted to the carriage frontward member and which extends in the feed direction beyond the carriage frontward member;
   an actuator extending between the carriage and the support bed the actuator being extendable to cause the support bed to pivot to take on an inclined orientation configured to discharge a decedent supported on the support bed into an interior of a heated crematory oven into which the support bed extends, wherein the actuator is positioned entirely rearwardly of the support bed to thereby be remote from the heated crematory oven.

2. The crematory lift of claim 1 wherein the support bed has a top wall with an upper surface, and the support bed comprises a ball segment and a roller segment positioned frontwardly of the ball segment, the ball segment having a plurality of rotatable balls mounted to the top wall to project above the upper surface, and the roller segment has a plurality of cylindrical rollers rotatably mounted with respect to the top wall to project above the upper surface, the ball segment receiving a load for sideward positioning on the support bed, and the roller segment configured for advancement of the load in the feed direction into the crematory oven.

3. The crematory lift of claim 1 wherein the support bed has a top wall with an upper surface, and two side walls extend downwardly from the top wall and are spaced from one another in the cross direction, wherein the side walls are pivotably mounted by at least one bearing to the frontward member of the carriage to define a first segment which overlies the frontward member between the at least one bearing and the vertical member of the frame, and a second segment which extends in the feed direction beyond the at least one bearing and the frontward member; and portions of the top wall which define a plurality of strap mounts, each strap mount comprising a U-shaped slot which pierces the top wall and which wraps around a strap support tab, each strap mount being unobstructed by the carriage frontward member such that a lifting strap is configured to pass over the support tab to extend beneath a decedent positioned beneath the support bed for the elevating of the support bed by the raising of the carriage on the vertical member of the frame.

4. The crematory lift of claim 1 wherein the support bed has a top wall with an upper surface, and two side walls which extend downwardly from the top wall and are spaced from one another in the cross direction, and wherein the carriage frontward member comprises two tines spaced from each other in the cross direction, and wherein each tine has a bearing fixed thereto, and a shaft extends through the two bearings into side walls to mount the support bed to the tines for pivotable motion thereon, and further comprising:
   two pivot arms fixed beneath the support bed top wall and extending rearwardly of the top wall towards the frame vertical member, the actuator being pivotably connected at one end between the two pivot arms.

5. The crematory lift of claim 4 further comprising a stiffening angle fixed to the top wall beneath the upper surface of the top wall and extending in the feed direction.

6. A crematory lift comprising:
   a frame having a vertically extending member;
   portions of the frame which define two legs spaced apart from each other a first distance in a cross direction, and which extend away from the frame in a feed direction, which is perpendicular to the cross direction;
   a carriage mounted to the frame for vertical motion thereon, the carriage having a frontward member which extends away from the frame vertically extending member in the feed direction;
   a support bed which is pivotably mounted to the carriage frontward member and which extends in the feed direction beyond the carriage frontward member, wherein the support bed has a top wall with an upper surface, and the support bed comprises a ball segment and a roller segment positioned frontwardly of the ball segment, the ball segment having a plurality of rotatable balls mounted to the top wall to project above the upper surface, and the roller segment has a plurality of cylindrical rollers mounted with respect to the top wall to project above the upper surface, the cylindrical rollers being rotatable about axes which extend in the cross direction, the ball segment configured to receive a load for sideward positioning on the support bed, and the roller segment configured for advancement of the load in the feed direction into the crematory oven;
   an actuator extending between the carriage and the support bed, the actuator being extendable to cause the support bed to pivot to take on an inclined orientation configured to discharge a decedent supported on the support bed into an interior of a heated crematory oven into which the support bed extends.

7. The crematory lift of claim 6 wherein two side walls extend downwardly from the top wall of the support bed and are spaced from one another in the cross direction, wherein the side walls are pivotably mounted by at least one bearing to the frontward member of the carriage to define a first segment which overlies the frontward member between the at least one bearing and the vertical member of the frame, and a second segment which extends in the feed direction beyond the at least one bearing and the frontward member; and further comprising:
portions of the top wall which define a plurality of strap mounts, each strap mount comprising a U-shaped slot which pierces the top wall and which wraps around a strap support tab, each strap mount being unobstructed by the carriage frontward member such that a lifting strap is configured to pass over the support tab to extend beneath a decedent positioned beneath the support bed for the elevating of the support bed by the raising of the carriage on the vertical member of the frame.

8. The crematory lift of claim 6 wherein the support bed has two side walls which extend downwardly from the top wall of the support bed and are spaced from one another in the cross direction, and wherein the carriage frontward member comprises two tines spaced from each other in the cross direction, and wherein each tine has a bearing fixed thereto, and a shaft extends through the two bearings into the side walls of the support bed to mount the support bed to the tines for pivotable motion thereon, wherein the actuator is positioned rearwardly of the support bed to thereby be remote from the heated crematory oven and further comprising:
two pivot arms fixed beneath the top wall of the support bed and extending rearwardly of the top wall towards the frame vertical member, the actuator being pivotably connected at one end between the two pivot arms.

9. The crematory lift of claim 6 further comprising a stiffening angle fixed to the top wall beneath the upper surface of the top wall and extending in the feed direction.

10. A crematory lift comprising:
a frame having a vertically extending member;
portions of the frame which define two legs spaced apart from each other a first distance in a cross direction, and which extend away from the frame in a feed direction, which is perpendicular to the cross direction;
a carriage mounted to the frame for vertical motion thereon, the carriage having a frontward member which extends away from the frame vertically extending member in the feed direction;
a support bed having a top wall with a top surface, the support bed being pivotably mounted to the carriage frontward member and extending in the feed direction beyond the carriage frontward member; and
portions of the top wall which define a plurality of strap mounts, each strap mount comprising a U-shaped slot which pierces the top wall and which wraps around a strap support tab, each strap mount being unobstructed by the carriage frontward member such that a lifting strap is configured to pass over the support tab to extend beneath a decedent positioned beneath the support bed for the elevating of the support bed by the raising of the carriage on the vertical member of the frame;
an actuator extending between the carriage and the support bed, the actuator being extendable to cause the support bed to pivot to take on an inclined orientation configured to discharge a decedent supported on the support bed into an interior of a heated crematory oven into which the support bed extends.

11. The crematory lift of claim 10 wherein the support bed further comprises a ball segment and a roller segment positioned frontwardly of the ball segment, the ball segment having a plurality of rotatable balls mounted to the top wall to project above the upper surface, and the roller segment having a plurality of cylindrical rollers rotatably mounted with respect to the top wall to project above the upper surface, the ball segment receiving a load for sideward positioning on the support bed, and the roller segment configured for advancement of the load in the feed direction into the crematory oven.

12. The crematory lift of claim 10 wherein the support bed has two side walls which extend downwardly from the top wall and are spaced from one another in the cross direction, and wherein the carriage frontward member comprises two tines spaced from each other in the cross direction, and wherein each tine has a bearing fixed thereto, and a shaft extends through the two bearings into side walls to mount the support bed to the tines for pivotable motion thereon, and further comprising:
two pivot arms fixed beneath the support bed top wall and extending rearwardly of the top wall towards the frame vertical member, the actuator being pivotably connected at one end between the two pivot arms.

13. The crematory lift of claim 12 further comprising a stiffening angle fixed to the top wall beneath the upper surface of the top wall and extending in the feed direction.

* * * * *